Aug. 19, 1969        G. D. GRIFFIN        3,462,732

SEAT BELT SAFETY SYSTEM

Filed April 14, 1967        2 Sheets-Sheet 1

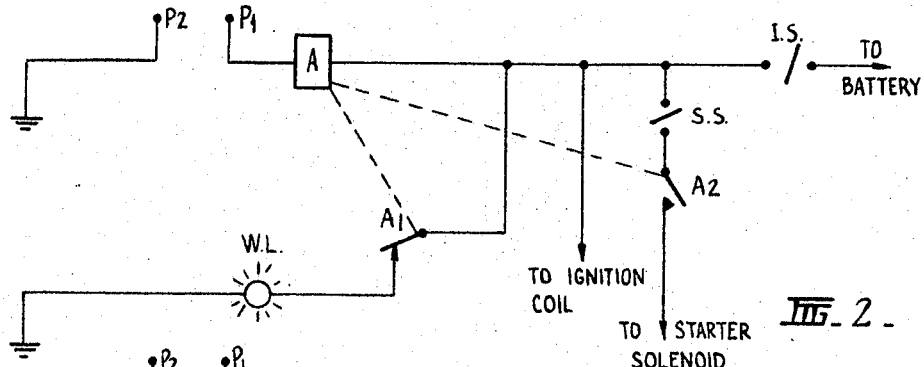
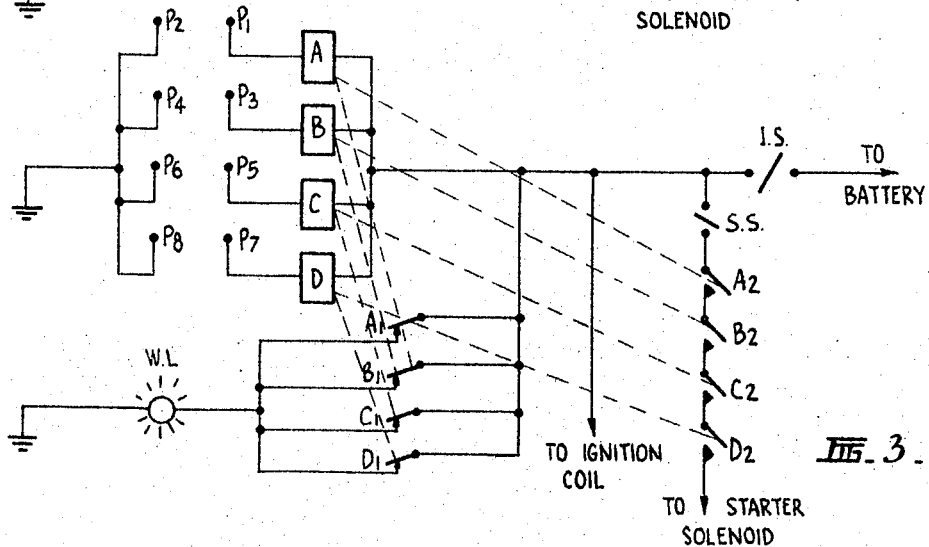
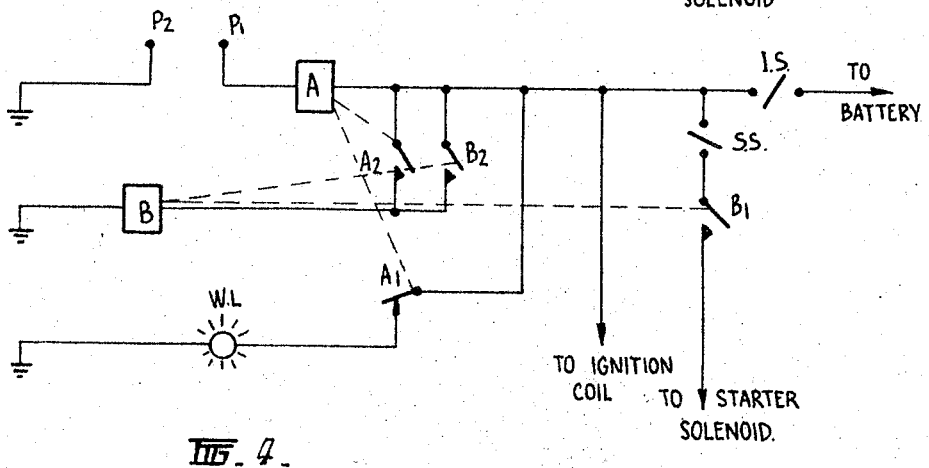

3,462,732
SEAT BELT SAFETY SYSTEM
Gordon Douglas Griffin, Roland Highway,
Spreyton, Tasmania, Australia
Filed Apr. 14, 1967, Ser. No. 631,044
Claims priority, application Australia, July 20, 1966,
8,580/66; Aug. 10, 1966, 9,486/66
Int. Cl. B60q 1/00; G08b 5/00
U.S. Cl. 340—52                                5 Claims

ABSTRACT OF THE DISCLOSURE

A vehicle safety device in which a seat belt is wired to complete part of an electrical circuit when in its fastened condition and wherein a solenoid is connected in series with the wiring of the seat belt, the solenoid controlling a switch having a pair of normally open contacts which form part of the ignition circuit of a vehicle, there being connected warning means in parallel with part of the circuit containing the seat belt and a switch in series with the warning means controlled by the solenoid to open when the seat belt circuit is closed and to close when the seat belt circuit is opened.

---

This invention relates to a safety device for automobiles and more particularly to means whereby it will be impossible for a driver to operate his vehicle without having first connected his seat belt, and/or whereby he will be given a visual or audible signal if his seat belt becomes disconnected either deliberately or accidentally at any time when the ignition switch of the vehicle is turned on.

In recent years there has been considerable research into the causes and the prevention of injury to people involved in road accidents, as a result of which it has been established that 80% of serious injuries can be prevented by the wearing of appropriate seat belts. As a result, many drivers have conscientiously installed seat belts in their vehicles, but a large proportion of them either never use their belts or use them only for high speed country driving. The effectiveness of the safety precaution is thus considerably diminished. This is particularly true in the light of statistical evidence that 90% of road accidents occur within ten miles of the place of residence of the persons involved. Despite the wide publicity given to these statistics many drivers feel that there is no necessity to use their seat belts for city driving or for short trips to the local shopping centre.

It is therefore clear that there is a need for some means of reminding motorists to connect their seat belts before driving.

This may be achieved broadly in either of two ways, firstly by an arrangement which will prevent starting of the motor unless the seat belt is connected, or secondly an arrangement which will operate an audible or visual signal if the motor is started without the seat belt connected.

Starting of the motor can be prevented either by interrupting the circuit to the ignition coil or by interrupting the circuit to the starter solenoid.

According to one of its aspects the invention provides the combination of a seat belt wired to complete part of an electrical circuit when in its fastened condition, a solenoid in series with the wiring of said seat belt, and a switch controlled by said solenoid and having a pair of normally open contacts, said switch being adapted to form part of the ignition circuit of a vehicle.

According to another of its aspects the invention provides the combination of a seat belt wired to complete part of an electrical circuit when in its fastened condition, a solenoid in series with the wiring of said seat belt, and a switch controlled by said solenoid and having a pair of normally open contacts, said switch being adapted to form part of the starter motor control circuit of a vehicle.

In either case there is preferably provided a visual or audible warning device wired in parallel with said seat belt and said solenoid, the flow of current to said warning device being controlled by a pair of normally closed contacts arranged to be operated by said solenoid. The flow of current through the seat belt circuit and through the warning device circuit may be controlled by the ignition switch of the vehicle.

As a variation of the forms of the invention above defined, the normally open contacts in the starter motor control circuit may be operated by a second solenoid in a holding circuit wired in parallel with the seat belt and first solenoid, the holding circuit having a pair of normally open contacts controlled by the first solenoid in parallel with the second pair of normally open contacts controlled by the second solenoid.

In any one of the above defined arrangements two or more seat belts may be wired in series.

In order that the invention may be more readily understood it will now be described by way of example with reference to the accompanying drawings wherein:

FIGURE 2 is a wiring diagram showing the application of the invention to the control of the starter solenoid of a vehicle, there being provided only one seat belt or a plurality of seat belts wired in series;

FIGURE 3 is a wiring diagram generally similar to FIGURE 2, but with four seat belts wired in parallel; and FIGURE 4 is a wiring diagram generally similar to FIGURE 2, but including a holding circuit.

Figure 1:
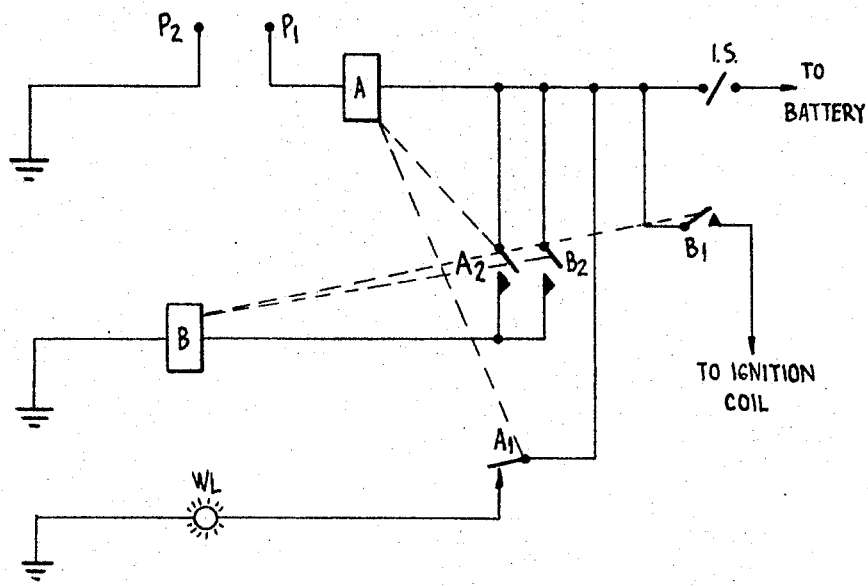
FIGURE 1 is a wiring diagram showing the application of the invention to the control of the ignition circuit of a vehicle.

Referring now to FIGURE 1 the drawing shows an ignition switch IS connected at one side to the battery of the vehicle and at the other side through a pair of normally open contacts BI to the ignition coil. The second side of the ignition switch is also connected through a solenoid A to a point $P_1$ adapted to be connected to one side of a seat belt constructed in such manner that the closing of the buckle of the seat belt results in an electrical connection as well as a physical connection between the two sides.

The vehicle is preferably provided with four seat belts which are all wired in series, the outlet side of the fourth belt being connected to point $P_2$ and thence to ground.

In parallel with the seat belt circuit there is provided a third circuit which includes the normally open contacts $A_2$ and solenoid B. Normally open contacts $B_2$ are wired in parallel with contacts $A_2$.

In parallel with the seat belt circuit and the third circuit there is a fourth circuit which includes the normally closed contacts $A_1$ and a buzzer or warning light WL.

The operation of this circuit is as follows:

With the vehicle at rest the ignition switch is open, contacts $B_1$, $B_2$ and $A_2$ are open and contacts $A_1$ are closed. The ignition switch is then turned on and unless the buckles of all four seat belts are connected the only effect will be to energize the buzzer or warning light WL, thus reminding the driver that it is necessary to connect his seat belt and/or his passengers' seat belts.

On the other hand if the seat belts are already connected when the ignition switch is turned on, solenoid A will be energized thus closing contacts $A_2$ and opening contacts $A_1$. With contacts $A_1$ opened the buzzer or warning light WL is disconnected from the circuit. Closure of contacts $A_2$ energises solenoid B, which closes contacts $B_1$ to complete the ignition circuit and closes contacts $B_2$ to complete a holding circuit for solenoid B. This arrangement permits one or more seat belts to be disconnected after the engine has been started without interrupting the ignition circuit, but solenoid A will be deenergized thus allowing contacts $A_2$ to open and contacts $A_1$ to close. Closure of contacts $A_1$ operates the buzzer or warning light.

It is thus possible for the driver to disconnect his seat belt to permit greater freedom of body movement for manoeuvering the vehicle in confined spaces. The warning device will, however, operate continuously during this period and will therefore remind the driver to reconnect his seat belt before driving away.

The warning device will also be operated if at any time any one of the seat belts becomes accidentally disconnected; this is a particularly valuable safety feature when there are small children in the vehicle who may play with their seat belt buckles and accidentally disconnect them. The driver will be immediately apprised of any such interference with any one of the buckles and can take such action as is necessary to ensure that the buckle is reconnected.

Using a small relay as the operating solenoid, the integers described can be made into a unit approximately the size of a match box and secured to any convenient position within the vehicle. The unit is provided with the necessary points for connection to the seat belts, the battery, the ignitioin coil and to ground. If so desired, an isolating switch may be provided to disconnect the unit, the effect of the isolating switch being to either close or bridge contacts $B_1$ and to interrupt the line to the seat belt circuit and the third and fourth circuits.

As a simplification of the above described wiring diagram, the fourth circuit may be omitted. There will then be no audible or visual signal to indicate the necessity to connect or reconnect a seat belt buckle, but it will still be impossible to start the engine without having connected all of the seat belt buckles, and it will be possible for the driver to disconnect his buckle to facilitate manoeuvering in confined spaces.

As an alternative simplification, the third circuit containing contacts $A_2$ and $B_2$ and solenoid B may be omitted and contacts $B_1$ omitted. The driver will then have at all times an audible or visual indication of the condition of the seat belt buckles in his vehicle, but will not be prevented from operating his vehicle with one or more buckles disconnected.

It will be appreicated that where there are fewer than four people in the vehicle those seat belts which are not being used can be connected and left lying on the respective seats.

The voltage drop through the seat belts is considerably below the output voltage of the battery of the vehicle due to the presence of relay A in the circuit. Hence the current flow is limited and there can be no danger to users of the equipment from such causes as electrical shock arcing between the parts of the buckles as they are connected or disconnected, or from electrical heating of the buckles. Additionally if the buckle comes into contact with the metal part of the frame of the vehicle there will be no arcing and no weakening of the battery.

The arrangement above described has been found to operate satisfactorily where both the ignition circuit and the control circuit are in good condition and performing their appointed functions. However, a dissadvantage of this arrangement is that if the engine fails to start when the motor is operated, it is difficult to determine whether the fault, if electrical, is in the ignition circuit itself or in the associated control circuit. Ignition circuits are rather complex and can be prevented from operating satisfactorily due to any one of a large number of factors.

By contrast the starting circuit of most vehicles is relatively simple. A standard form of starting arrangement comprises a starter motor which has its winding connected on one side through a solenoid-operated switch to a battery and on the other side direct to ground. The solenoid-operated switch is controlled by a second circuit passing through a starter switch on the dashboard of the vehicle. This is quite a straight forward arrangement and seldom gives rise to operating problems.

The form of the invention illustrated in FIGURE 2 is based on the realization that, if a control circuit responsive to connection of seat belts is associated with the starting mechanism rather than with the ignition circuit two important advantages will be derived. The first of these is that if the starter motor does not operate in response to closing of the contacts of the starter switch when the seat belt or seat belts in the vehicle have been connected, fault finding is simplified since the cause is far more likely to be found in the control circuit than in the starting circuit. The second advantage is that if there is a fault in the control circuit, the driver will automatically be prevented from discharging the battery of the vehicle by futile use of the starter motor as could occur in the case where the control circuit is associated with the ignition coil.

The circuit diagram of FIGURE 2 includes four circuits. The first being the starter circuit and including a manually operable starter switch SS, a pair of normally open contacts $A_2$ and the solenoid of the solenoid switch controlling the starter motor of the vehicle.

The second circuit is the ignition circuit and includes manually operable ignition switch IS and the ignition coil. These two circuits are in parallel with each other.

The third circuit is in parallel with the ignition coil and includes a solenoid A and two points P1 and P2 between which the seat belts of the vehicle may be connected in series. Point P2 is connected to ground.

The fourth circuit is in parallel with the third circuit and includes the normally closed contacts $A_1$ and a warning device such as a warning light or buzzer, WL which is connected to ground. Points $A_1$ and $A_2$ are controlled by solenoid A. The operation of this circuit is as follows:

If the ignition switch is turned on when one or more seat belts are disconnected, current is fed through closed contacts $A_1$ to the warning device WL to give the driver a visual or audible reminder that it is unsafe to start the vehicle. If despite of this warning he persists in attempting to start the vehicle and closes the starter switch, he finds that due to contacts $A_2$ being open no current is fed to the starter solenoid, and he is unable to start the engine of the vehicle. On the other hand if the seat belts are connected when the ignition switch is operated, solenoid A is energized to open contacts $A_1$ and close contacts $A_2$. The warning device is thus taken out of circuit and the starting circuit is prepared for operation by the closing of the manually operated starter switch SS. There is a constant circuit to the ignition coil, and hence if one or more seat belts should be undone after the engine has been started the operation of the engine will not be interrupted, but due to de-energization of solenoid A, contacts $A_1$ will close and the warning device WL will operate. The warning device can, if so desired, be omitted from the arrangement, and in such case it will still be impossible to start the engine without the seat belts connected but there will be no warning of subsequent disconnection of the belts.

The circuit above described is suitable for use with most of the more common types of seat belts which use fabric straps connected to two or three anchoring points. It is, however, unsuitable for use with a different type of seat belt wherein the strap is coiled on a reel when not in use, and is withdrawn from the reel and placed over a hook secured to the body of the vehicle when required to perform its function as a seat belt. It is also unsuitable for use with that type of seat belt which consists of a single long strap adapted to function as both a lap strap and a sash. This type of belt has its two ends anchored to the body of the vehicle and carries a buckle-like member between its ends for engagement with an anchorage point mounted on the floor of the body of the vehicle between a pair of bucket seats.

The circuit of FIGURE 2 can be adapted to these two types of seat belts if the retaining hook is mounted on the body in such manner as to be electrically insulated therefrom. The interposition of insulation can be inconvenient particularly if where the seat belts have already been installed in a vehicle, and could be subject to failure in use.

FIGURE 3 therefore represents a circuit which provides for the connecting of one side of each of four seat belts to ground. The starter circuit is again uncontrolled by the ignition switch and is provided with a manually operable starter switch, SS and four pairs of normally open contacts $A_2$, $B_2$, $C_2$ and $D_2$ interposed between the battery and the solenoid of the solenoid switch which operates the starter motor. The ignition circuit is the same as in FIGURE 2 having a manually operable ignition switch IS and a connection to the ignition coil.

The connection to the seat belts consists of four parallel circuits which are, in turn, in parallel with the ignition coil. One of these circuits has a solenoid A and two points $P_1$ and $P_2$ between which a seat belt is adapted to form the connection, point $P_2$ being connected to ground. A second one of these circuits has a solenoid B and two points $P_3$ and $P_4$ between which a second seat belt is adapted to be connected, point $P_4$ being connected to ground. Similarly in the third and fourth circuits there are provided solenoids C and D respectively, and seat belt connecting points $P_5$, $P_6$ and $P_7$, $P_8$ points $P_6$ and $P_8$ being connected to ground.

Also in parallel with the ignition coil there is a warning circuit comprising a warning device WL in the form of a light or a buzzer and four parallel pairs of normally closed contacts $A_1$, $B_1$, $C_1$ and $D_1$. The warning device WL is connected to ground.

Solenoid A controls points $A_1$, $A_2$; solenoid B controls points $B_1$, $B_2$; solenoid C controls $C_1$, $C_2$; and solenoid D controls points $D_1$, $D_2$. The operation of this circuit is as follows:

If the ignition switch is turned on with any one or more of the seat belts disconnected, the warning circuit will be energized and the starter solenoid circuit will be open. For example, if belt B is disconnected, contacts $B_1$ will remain closed to complete the circuit to the warning device, and points $B_2$ will remain open to disconnect the starter solenoid. Thus if any one or more of the seat belts is disconnected, the driver will be given a warning of this fact and will be prevented from operating the starter motor of his vehicle.

If all of the seat belts are connected at the moment when the ignition switch is turned on, contacts $A_1$, $B_1$, $C_1$ and $D_1$ will be opened by their respective solenoids to isolate the warning device, and contacts $A_2$, $B_2$, $C_2$ and $D_2$ will be closed by their respective solenoids to permit the circuit to the starter solenoid to be completed by the closing of manual starter switch SS. If any one of the seat belts is disconnected while the engine is running, the warning circuit will again be completed to notify the driver of this condition but the operation of the engine will not be interrupted.

The arrangement illustrated in FIGURE 4 is identical with that illustrated in FIGURE 1 with the exception that the normally open contacts $B_1$, instead of being in the ignition coil circuit, are placed in the circuit to the starter solenoid.

The main application of this arrangement is to installations where the electrical contact between the two halves of the buckles of the seat belts is unreliable.

It will be appreciated that with the ignition switch on, the simultaneous completion of the circuit through all of the seat belts for even a very short period will energize solenoid B to complete a holding circuit for contacts $B_1$, thereby avoiding the situation wherein the operation of the starter motor is interrupted before the engine has been started due to an interruption in the electrical circuit through one or more of the seat belts.

It will be realized that if the circuit through the belts should become interrupted solenoid A will be de-energized permitting contacts $A_1$ to close and thereby feeding current through the warning device WL. This could be inconvenient and distracting and hence in most cases where the holding circuit is employed the warning circuit will be dispensed with.

In any one of the above embodiments the circuits through the seat belts can be completed by the use of a coiled wire similar to the wire used on telephone hand sets, this being a convenient means of adapting existing seat belts to the apparatus of the invention.

Alternatively an insulated flexible wire may be incorporated as one of the threads in the weaving of the seat belt during manufacture. Such a wire may be readily connected into an electrical circuit.

Again the seat belt may be woven in tubular form and have an insulated wire threaded through the center of it, or the belt may be made of electrically conductive metallized thread or fabric. In the latter case the belt will be connected to its anchorage point or points with an interposed insulating bush or the like.

The basic principles of the invention can be applied to ensuring that all passengers' seat belts are connected in aircraft before takeoff, although in this case it will usually be undesirable to associate the apparatus of the invention with the controls of the aircraft.

A suitable circuit is one in which a number of seat belts, e.g. eight or ten, are connected in series in such manner that a warning device such as an electric lamp located in the galley, the flight control cabin or other suitable place will glow if any one of the seat belts in the group is not connected.

In one practical arrangement there may be provided three parallel circuits for each group of seats, each group of circuits being controlled by a monitoring switch. The first circuit of each group passes through a solenoid and through the series connected belts to ground, while the second circuit passes through a pair of normally closed contacts and a red warning light to ground, and the third circuit passes through a pair of normally open contacts and a green light to ground. The two pairs of contacts are under the control of the solenoid.

It is thus clear that if the hostess wishes to check whether the seat belts in a particular group of seats have been connected, she does not have to visually inspect the seat belts as at present, but merely has to operate the monitoring switch for that group of seats. If all of the seat belts have been connected, the solenoid will be energized to open the circuit through the red warning light and close the circuit through the green lamp. On the other hand, if one or more of the seat belts in the group of seats is not connected the circuit through the red warning lamp will remain closed and the circuit through the green lamp will remain open.

The hostess can thus determine, by observing whether operating of the monitoring switch results in a green or a red indication, whether all of the seat belts in the group of seats under consideration have been connected.

I claim:

1. A safety device for vehicles comprising the combination of a seat belt wire to complete part of an electrical circuit when in its fastened condition, a solenoid in series with the wiring of said seat belt, a switch controlled by said solenoid and having a pair of normally open contacts, said switch forming part of the ignition circuit of a vehicle, warning means connected in parallel with the part of the circuit containing the seat belt, and a switch connected in series with said warning means and controlled by said solenoid to open when the seat belt circuit is closed and close when the seat belt circuit is opened.

2. A safety device for vehicles comprising the combination of a seat belt wired to complete part of an electrical circuit when in its fastened condition, a first solenoid in series with the wiring of said belt, a second solenoid wired in parallel with said first solenoid and said seat belt, a pair of normally open contacts controlled by said first solenoid in series with the second solenoid, a first pair of normally open contacts controlled by said second solenoid wire in series with the ignition coil of a vehicle, and a second pair of normally open contacts controlled by said second solenoid wire in parallel with the normally open contacts of the first solenoid but in series with the second solenoid.

3. A safety device for vehicles comprising combination of a seat belt wired to complete part of an electrical circuit when in its fastened condition, a first solenoid in series with the wiring of said seat belt, a second solenoid wired in parallel with said seat belt and said first solenoid, a first pair of normally closed contacts controlled by said first solenoid in parallel with the circuits containing said first and second solenoids, a warning device in series with said normally closed contacts, a pair of normally open contacts controlled by said first solenoid in series with said second solenoid, a first pair of normally open contacts controlled by said second solenoid wired in series with the ignition coil of a vehicle, and a second pair of normally open contacts controlled by said second solenoid wired in parallel with the normally open contacts controlled by said first solenoid and in series with said second solenoid.

4. A safety device for vehicles comprising the combination of a seat belt wired to complete part of an electrical circuit when in its fastened condition and connected in parallel with the ignition coil of a vehicle; a first solenoid wire in series with said seat belt in the seat belt circuit; a further circuit in parallel with the seat belt circuit and the ignition coil circuit; said further circuit including a first pair of normally open contacts adapted to be closed by said solenoid when the latter is energized, and a second solenoid; a second pair of normally open contacts wired in parallel with said first pair of normally open contacts, said second contacts being closed by said second solenoid when the latter is energized; and a pair of normally open contacts in series with the ignition coil to be closed by the second solenoid when the latter is energized.

5. A safety device for vehicles comprising the combination of a seat belt wired to complete part of an electrical circuit when in its fastened condition and wired in parallel with the ignition coil of a vehicle; a first solenoid wired in series with said seat belt in the seat belt circuit; a further circuit in parallel with the seat belt circuit and the ignition coil circuit; said further circuit including a pair of normally open contacts adapted to be closed by the first solenoid when the latter is energized and a second solenoid; a second pair of normally open contacts in parallel with the pair of normally open contacts and adapted to be closed by the second solenoid when the later is energized; an additional circuit in parallel with the seat belt circuit, the ignition coil circuit and the further circuit; said additional circuit including a pair of normally closed contacts adapted to be opened by the first solenoid when the latter is energized, and an electrically operated warning device; and a pair of normally open contacts in series with the ignition coil in the ignition coil circuit adapted to be closed by the second solenoid when the latter is energized.

References Cited

UNITED STATES PATENTS

| | | |
|---|---|---|
| 2,868,309 | 1/1959 | Burgess. |
| 3,074,055 | 1/1963 | Rudolph et al. |
| 3,340,523 | 9/1967 | Whitman. |

A. HARRY LEVY, Primary Examiner

U.S. Cl. X.R.

180—82; 340—278